Nov. 15, 1927. 1,649,701
P. JODECK
PROCESS FOR OBTAINING LIQUID SULPHUROUS ACID FROM THE PRODUCTS OF
COMBUSTION OF SULPHUR OR SULPHUROUS PYRITES
Filed July 12, 1926
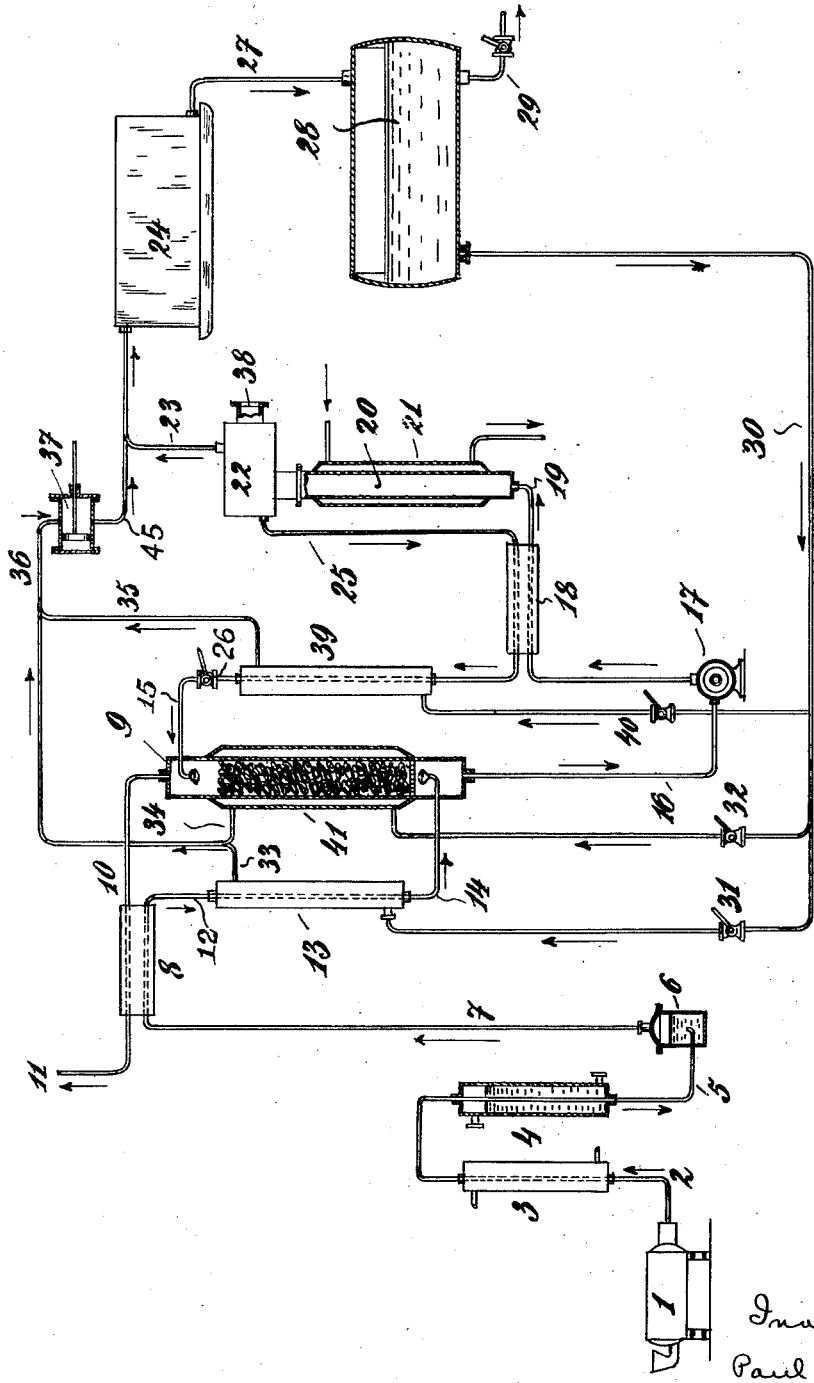
Inventor:
Paul Jodeck,
By: Knight Bros.
Attys.

Patented Nov. 15, 1927.

1,649,701

UNITED STATES PATENT OFFICE.

PAUL JODECK, OF BERLIN, GERMANY, ASSIGNOR TO ALLGEMEINE GESELLSCHAFT FÜR CHEMISCHE INDUSTRIE M. B. H., OF BERLIN-SCHONEBERG, A CORPORATION OF GERMANY.

PROCESS FOR OBTAINING LIQUID SULPHUROUS ACID FROM THE PRODUCTS OF COMBUSTION OF SULPHUR OR SULPHUROUS PYRITES.

Application filed July 12, 1926, Serial No. 121,963, and in Germany November 13, 1924.

In the production of liquid sulphur dioxide sulphur or sulphurous pyrites or other suitable sulphurous material, as waste gas-purifying material, are burned. The products of this combustion, consisting of a mixture of sulphur dioxide, oxygen, nitrogen, and very small quantities of sulphuric anhydride, are cooled, led through an absorbing pot where the traces of said anhydride are retained, and the remaining gases are supplied thereupon to a suitable apparatus, for instance a trickling tower, where the sulphur dioxide is absorbed by water, while the mixture of oxygen and nitrogen escapes. The aqueous solution of $SO_2$ from said absorbing tower is heated, whereby $SO_2$ and small quantities of water are evaporated, the $SO_2$-vapours are conducted through drying apparatus, for instance towers irrigated by sulphuric acid, whereby they are deprived of the water, and are collected in a gas tank. A compressor sucks said $SO_2$ from the tank and presses it into a liquefier which consists of a water-cooled pipe coil, from which, finally, the pure liquid sulphur dioxide is taken off.

Now the dissolving capacity of water is a comparatively small one; it amounts, for saturation, for instance at 15° C., to about 13,5 per cent (13,5 g. $SO_2$ per 100 ccm. of water), at +25° C., however, to only 9,4 per cent.

The products of combustion generally contain no more than 12 to 13 per cent of gaseous $SO_2$. Owing to this dilution of the $SO_2$-gas a saturated solution of $SO_2$ is far from being obtained, but merely a concentration in the aqueous solution of 1,8 to 2 per cent at 15° C. and 1,2 to 1,3 per cent at 25° C. Consequently, extraordinarily large quantities of water are required for this absorption which quantities must be heated to effect the expulsion of the sulphur dioxide.

Furthermore, all the parts of the plant which come into contact at the same time with the sulphur dioxide and water, must be made of acid-proof material, for instance lead or pottery, this increasing considerably the costs of the plant.

Now the object of the present invention is to have a process of the character stated in which the inconvenient dissolvent (water) is dispensed with and which does not suffer from the above-mentioned drawbacks. The invention substantially consists in that the $SO_2$-vapours from said products of combustion are absorbed by means of aromatic hydrocarbons which are free from oxygenous and nitrogenous products. Hydrocarbons of this kind possess a considerably greater dissolving capacity than water, and an $SO_2$-solution of this kind does not attack the apparatus. A less quantity of dissolvent will therefore suffice and a much smaller plant is required for the absorption and expulsion of the sulphur dioxide. A further advantage resides in the fact that all the parts of the plant become considerably simpler and cheaper, as they no longer need be acid-proof, as hitherto, and the drying apparatus for the sulphur dioxide is dispensed with, which is indispensable when water is employed as dissolvent. In order to further increase the absorbed quantity of sulphur dioxide or to decrease the quantity of dissolvent required for the absorption, the latter may take place at a low temperature. In this case the cooling of the $SO_2$-vapours and of the dissolvent, respectively, may be effected by the aid of a portion of the produced liquid sulphur dioxide.

The aromatic hydrocarbons to be used are gained by extracting the fractions of higher boiling point of the products of distillation of naphtha, for instance the fractions of 180 to 300°, by means of liquefied sulphur dioxide and by using for the absorbing purpose the portion thereof which is soluble in the liquefied sulphur dioxide. This mixture contains the aromatic and cyclic hydrocarbons contained in the hydrocarbons of naphtha, said hydrocarbons being more or less unsaturated and free from oxygenous and nitrogenous compounds and containing small quantities of sulphurous compounds in some cases only, for instance when Mexican distillation products of naphtha are made use of as initial material. However, as the analogy of benzole and thiophene shows, the chemical character of these latter compounds is the same as that of hydrocarbons.

The process of extracting $SO_2$ by means of hydrocarbons of naphtha is known in the art as the Edeleanu-process, and the fraction of said hydrocarbons which is soluble in the liquefied sulphur dioxide is denoted in the industry of naphtha as extract Edeleanu. Such an extract of aromatic hydrocarbons, gained for instance from the medium fraction, of a naphtha, called transformer oil distillate, has a dissolving capacity for $SO_2$ of 19 per cent (19 g. by 100 ccm. oil at $+15°$ C.). Although this extract with normal temperatures has a dissolving capacity which is about 40 per cent higher than that of water, it has no greater dissolving capacity than water with an increased temperature, for instance 90° C., which comes into consideration for the expulsion of $SO_2$ from the solution, so that almost the whole dissolved quantity of $SO_2$ can be gained.

In order to further lower the quantity of the circulating dissolvent, the dissolving capacity of said aromatic hydrocarbons may be further increased by causing the absorption to take place at lowered temperature, for instance 0° C. The dissolving capacity is thus increased to 53% (53 g. of $SO_2$ by 100 ccm. oil); water, when cooled down to 0° C., would have but a capacity of 22.8 per cent. To obtain this low temperature, either the aromatic hydrocarbons and the products of combustion of the $SO_2$ or the latter only must be cooled artificially. This may be effected for instance by evaporating the liquid sulphur dioxide produced in the plant in several suitable devices and by cooling thereby the aromatic hydrocarbons and products of combustion, or the aromatic hydrocarbons or said products of combustion alone, down to the desired temperature.

The cooling of the aromatic hydrocarbons and the gases of combustion, before entering the absorber, is not absolutely necessary; on the contrary, the desired low temperature may be produced in the absorber itself by cooling it, for instance, by means of a cooling jacket or a cooling pipe coil built in the tower.

It has already been proposed to make use, for production of liquefied sulphur dioxide, of the heavy oils of coal tar instead of water, for the absorption of the $SO_2$-gases. These heavy oils, however, contain, besides hydrocarbons, considerable quantities of oxygenous compounds (phenols) and large quantities of nitrogenous bases, which are well known to possess a great dissolving capacity for $SO_2$-gases. It would not be deduced forthwith from the use of this product for absorbing $SO_2$ gases, that a mixture of hydrocarbons which is free from phenol and basic components, would likewise be adapted to absorb $SO_2$ gases and even would surpass it considerably.

The disposition of a plant for producing liquid sulphur dioxide from pure sulphur according to the above-described process is diagrammatically shown in the accompanying drawing.

1 denotes the sulphur furnace where sulphur is burned with air supply. The products of combustion, consisting of $SO_2$, oxygen, nitrogen, small quantities of water vapour due to the humidity of the combustion air and very small quantities of $SO_3$, pass through pipe 2 first to the hot gas cooler 3 which is cooled by air, from which they pass through the water-cooled cooler 4, by the effect of which the temperature of the gases is lowered from about 450° to about 50° C. Through pipe 5 the cooled gases enter the absorbing pot 6, in which dilute sulphuric acid dissolves and retains the $SO_3$ formed and the water contained in the gases. The combustion gases further pass through pipe 7 and counterstream cooler 8, wherein they further deliver their heat to the cold remaining or waste gases which are led from the absorbing tower 9 through pipe 10 to the preliminary cooler 8 and escape through pipe 11 into the free air. The precooled gas mixture passes through pipe 12 into the final cooler 13 wherein it is cooled down by the cooling effect of evaporating $SO_2$ to the definite temperature, for instance 0°, and enters through pipe 14 the absorbing tower 9. This latter is fitted with a suitable filling material, for instance Raschig rings, over which trickle the aromatic hydrocarbons entering the tower above through pipe 15. The gas mixture rises within the tower, delivers the $SO_2$ to the oil and leaves the tower 9 through pipe 10 as a mixture containing but oxygen, nitrogen and traces of $SO_2$. The aromatic hydrocarbons absorb in the tower about 6 to 8 per cent of $SO_2$, collect in its lower portion and are supplied by pipe 16 to the pump 17 which delivers them through a heat exchanger 18 and pipe 19 to the evaporator 20 to which heat is supplied by means of the steam jacket 21. Under the action of this heat the aromatic hydrocarbons deliver again the absorbed $SO_2$ which reaches the upper portion 22 of the evaporator, leaves it through pipe 23 and enters the water-cooled liquefier 24, where this $SO_2$ is liquefied by the cooling action of the water.

In the evaporator there prevails a pressure of about 3 to 4 atm, according to the pressure of liquefaction which, in its turn, depends on the temperature of the trickling water.

The aromatic hydrocarbons entering the upper portion 22 of the evaporator 20 are substantially free from $SO_2$ and flow through pipe 25 to the heat exchanger 18. By the aid of a sight glass 38 and a throttling valve 26 arranged in the pipe 15 the delivery is controlled and the pressure prevailing in the evaporator prevented from passing over into the absorbing tower 9. According to the adjustment of the heating in the evaporator, the aromatic hydrocarbons acquire a temperature of 90° or more and deliver their heat in the exchanger 18 to the solution of oil and $SO_2$, whilst they themselves are cooled down to 2 to 3° C. Through pipe 15 they enter the absorbing tower 9 and begin their circulation anew. A cooler 39 may be arranged in the pipe 15, wherein the aromatic hydrocarbons are cooled down to the definite temperature of 0°.

The $SO_2$ condensed in the liquefier 24 flows through pipe 27 into the $SO_2$ collecting tank 28 from which it may be taken off through pipe 29.

A small portion of the produced liquid $SO_2$ is used for cooling the gas mixture in the final cooler 13 and in the absorbing tower 9 which to this end is fitted with a cooling jacket 41. The $SO_2$ is taken from the collecting tank 28 through pipe 30. Throttling valves 31, 32, 40 control the supply of $SO_2$ to the final cooler 13 for the gas mixture, to the final cooler 39 for the aromatic hydrocarbons and to the cooling jacket 41 of absorber 9. The liquid $SO_2$ is evaporated in said three cooling chambers, the vapours generated are drawn away through pipes 33, 34, 35, uniting into a pipe 36, by a compressor 37 which compresses them up to the pressure of liquefaction, and delivers them through pipe 45 to the liquefier 24 where they are condensed again.

What I claim is:

1. The process of recovering, in concentrated form, sulphur dioxide from a dilute gaseous mixture, which comprises treating a cooled body of said gaseous mixture with a non-oxygen-, non-nitrogen-, containing hydrocarbon reagent which has the property of being soluble in liquid sulphur dioxide, absorbing sulphur dioxide from said cooled gaseous mixture by said reagent, recovering said absorbed sulphur dioxide in a concentrated form from said reagent, and treating further quantities of cooled gaseous mixture with said reagent.

2. The process of recovering, in concentrated form, sulphur dioxide from a dilute gaseous mixture, which comprises treating a cooled body of said gaseous mixture with a non-oxygen-, non-nitrogen-, containing liquid hydrocarbon reagent and absorbing sulphur dioxide thereby from said dilute gaseous mixture, said reagent consisting of that portion of a hydrocarbon body which has a high boiling point and which has been extracted therefrom by liquid sulphur dioxide, recovering the absorbed sulphur dioxide in a concentrated form and liberating the reagent, and treating further quantities of a cooled dilute gaseous mixture containing sulphur dioxide with said liberated reagent.

3. The process of recovering, in concentrated form, sulphur dioxide from a dilute gaseous mixture, which comprises treating a cooled body of said gaseous mixture with a non-oxygen-, non-nitrogen-, containing liquid hydrocarbon reagent and absorbing sulphur dioxide thereby from said dilute gaseous mixture, said reagent consisting of that portion of a hydrocarbon body which has a boiling point of between 180° to 300° and which has been extracted therefrom by liquid sulphur dioxide, recovering the absorbed sulphur dioxide in a concentrated form and liberating the reagent, and treating further quantities of a cooled dilute gaseous mixture containing sulphur dioxide with said liberated reagent.

In testimony whereof the foregoing specification is signed.

PAUL JODECK.